(12) United States Patent
Fong

(10) Patent No.: US 7,793,980 B2
(45) Date of Patent: Sep. 14, 2010

(54) RETRACTABLE STEERING MECHANISM

(76) Inventor: Jian-Jhong Fong, 37, Alley 54, Lane 944, Sec. 2, Jhongshan Road, Changhua (TW)

( * ) Notice: Subject to any disclaimer, the term of this patent is extended or adjusted under 35 U.S.C. 154(b) by 97 days.

(21) Appl. No.: 11/923,673

(22) Filed: Oct. 25, 2007

(65) Prior Publication Data

US 2009/0108576 A1 Apr. 30, 2009

(51) Int. Cl.
*B62D 1/11* (2006.01)
*B62D 1/18* (2006.01)
*B62D 1/187* (2006.01)

(52) U.S. Cl. .................. 280/777; 280/775; 280/779; 74/492; 74/493; 60/632; 60/636; 60/638

(58) Field of Classification Search .............. 280/775, 280/777, 779; 74/492, 493; 60/632, 636, 60/638
See application file for complete search history.

(56) References Cited

U.S. PATENT DOCUMENTS

| | | | | |
|---|---|---|---|---|
| 5,113,716 | A * | 5/1992 | Dumschat et al. | 74/493 |
| 5,890,397 | A * | 4/1999 | Stoner et al. | 74/493 |
| 6,116,648 | A * | 9/2000 | Holly et al. | 280/777 |
| 7,165,786 | B1 * | 1/2007 | Sha et al. | 280/775 |
| 2002/0024208 | A1 * | 2/2002 | Fujiu et al. | 280/775 |
| 2002/0073798 | A1 * | 6/2002 | Ryne et al. | 74/492 |
| 2003/0164608 | A1 * | 9/2003 | Morita et al. | 280/775 |
| 2004/0083844 | A1 * | 5/2004 | Krizan et al. | 74/492 |
| 2007/0013180 | A1 * | 1/2007 | Stuedemann et al. | 280/775 |
| 2007/0013183 | A1 * | 1/2007 | Jensen et al. | 280/777 |
| 2007/0068311 | A1 * | 3/2007 | Shimoda et al. | 74/493 |
| 2007/0069513 | A1 * | 3/2007 | Kirihara et al. | 280/775 |
| 2007/0137381 | A1 * | 6/2007 | Arihara | 74/493 |

\* cited by examiner

*Primary Examiner*—Paul N. Dickson
*Assistant Examiner*—Barry Gooden, Jr.

(57) ABSTRACT

A retractable steering mechanism includes a steering wheel, a steering column connected to the steering wheel, a telescopic device connected to steering column, a connector for connecting the telescopic device to two front wheels of the vehicle. A first cover is connected to the vehicle. A second cover is connected to the first cover and includes at least two slots defined therein. A shell is used to house the steering column so that the steering column is rotational but not movable in the shell. The shell includes at two bosses formed thereon and movably disposed in the slots. A moving unit is provided between the vehicle and the shell and operable, in a car accident, to retract and tilt the shell due to the bosses moving in the slots.

1 Claim, 12 Drawing Sheets

RETRACTABLE STEERING MECHANISM

BACKGROUND OF INVENTION

1. Field of Invention

The present invention relates to a retractable steering mechanism including a steering wheel that is retracted from a driver before contact with the driver in a car accident.

2. Related Prior Art

Various devices, alone or in combination, have been used to dissipate shocks that would otherwise be transmitted to drivers in vehicles in car accidents. However, in a car accident, the driver might still hit the steering wheel due to the moment of inertia and get hurt.

To prevent drivers from hitting steering wheels, airbags have been provided in cars for inflation in car accidents. However, an airbag is quickly inflated by explosive air or other explosive gases in a car accident, and the quick or sudden inflation of the airbag exerts a large force against a driver so that the driver might be hurt by the airbag.

In addition, it is to be noted that the steering wheel is located right in front of the driver closely, and the distance between the steering wheel and the driver is too short for the inflation of the airbags so that the quick or sudden inflation of the airbags may exert a large force against the driver and cause injury to the driver.

There have been devices for retracting steering wheels in car accidents. In these conventional devices, the steering wheels are however retracted from drivers only after they are hit by the drivers. The drivers still take heavy blows from the steering wheels.

The present invention is therefore intended to obviate or at least alleviate the problems encountered in prior art.

SUMMARY OF INVENTION

The primary objective of the present invention is to provide a steering mechanism with a steering wheel that is retracted from a driver before contact with the driver in a car accident.

According to the present invention, a vehicle is provided with a retractable steering mechanism. The retractable steering mechanism includes a steering wheel, a steering column connected to the steering wheel, a telescopic device connected to steering column, a connector for connecting the telescopic device to two front wheels of the vehicle. A first cover is connected to the vehicle. A second cover is connected to the first cover and includes at least two slots defined therein. A shell is used to house the steering column so that the steering column is rotational but not movable in the shell. The shell includes at two bosses formed thereon and movably disposed in the slots. A moving unit is provided between the vehicle and the shell and operable, in a car accident, to retract and tilt the shell due to the bosses moving in the slots.

Other objectives, advantages and features of the present invention will become apparent from the following description referring to the attached drawings.

BRIEF DESCRIPTION OF DRAWINGS

The present invention will be described via the detailed illustration of five embodiments referring to the drawings in which.

DETAILED DESCRIPTION OF EMBODIMENTS

Figure 1:
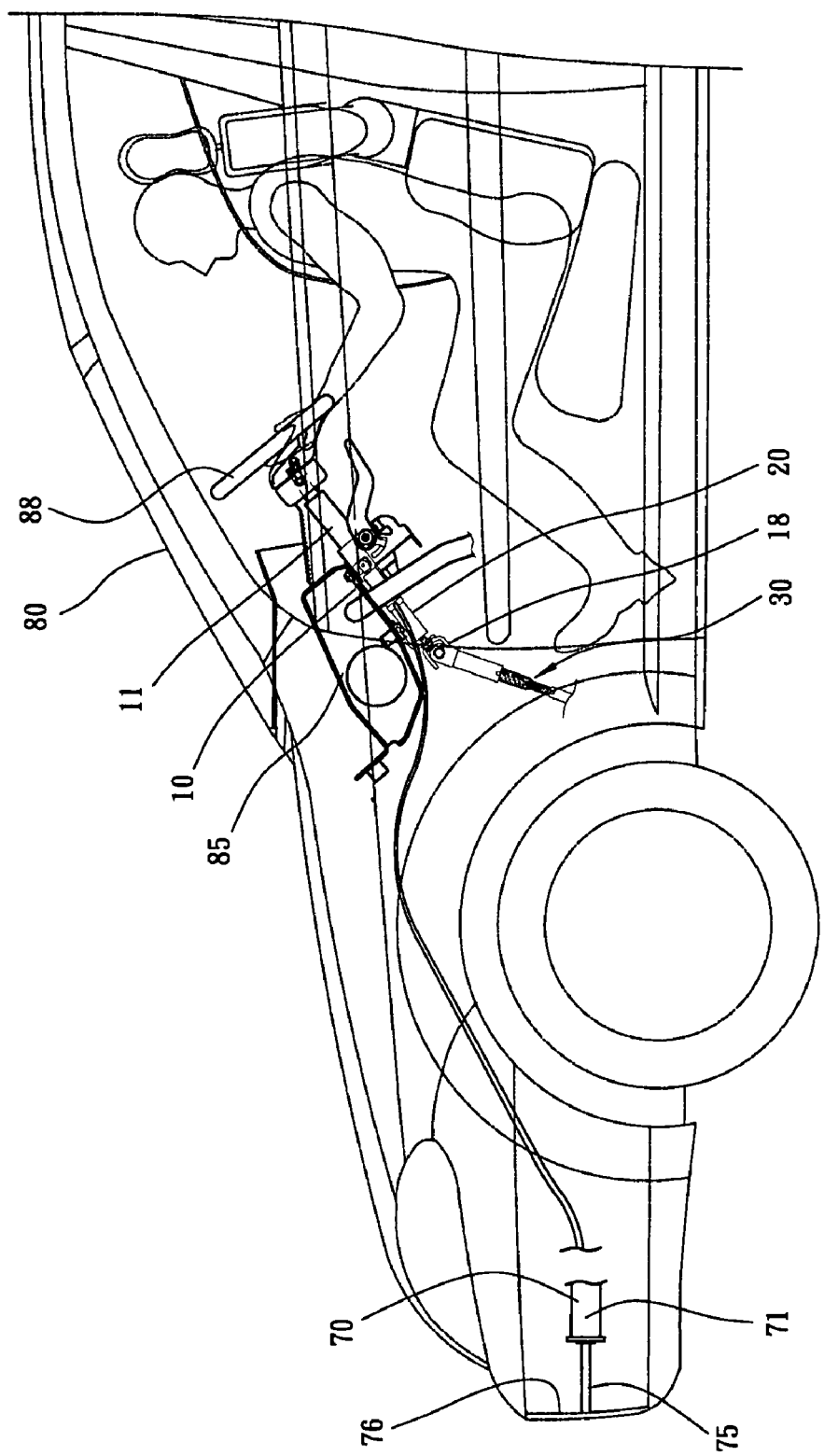
FIG. 1 is a side view of a driver in a car equipped with a retractable steering mechanism in accordance with the first embodiment of the present invention.

Referring to FIG. 1, a vehicle 80 includes two front wheels 82 and a retractable steering mechanism according to a first embodiment of the present invention. The vehicle 80 is further equipped with a frame 85 for supporting a dashboard.

Figure 2:
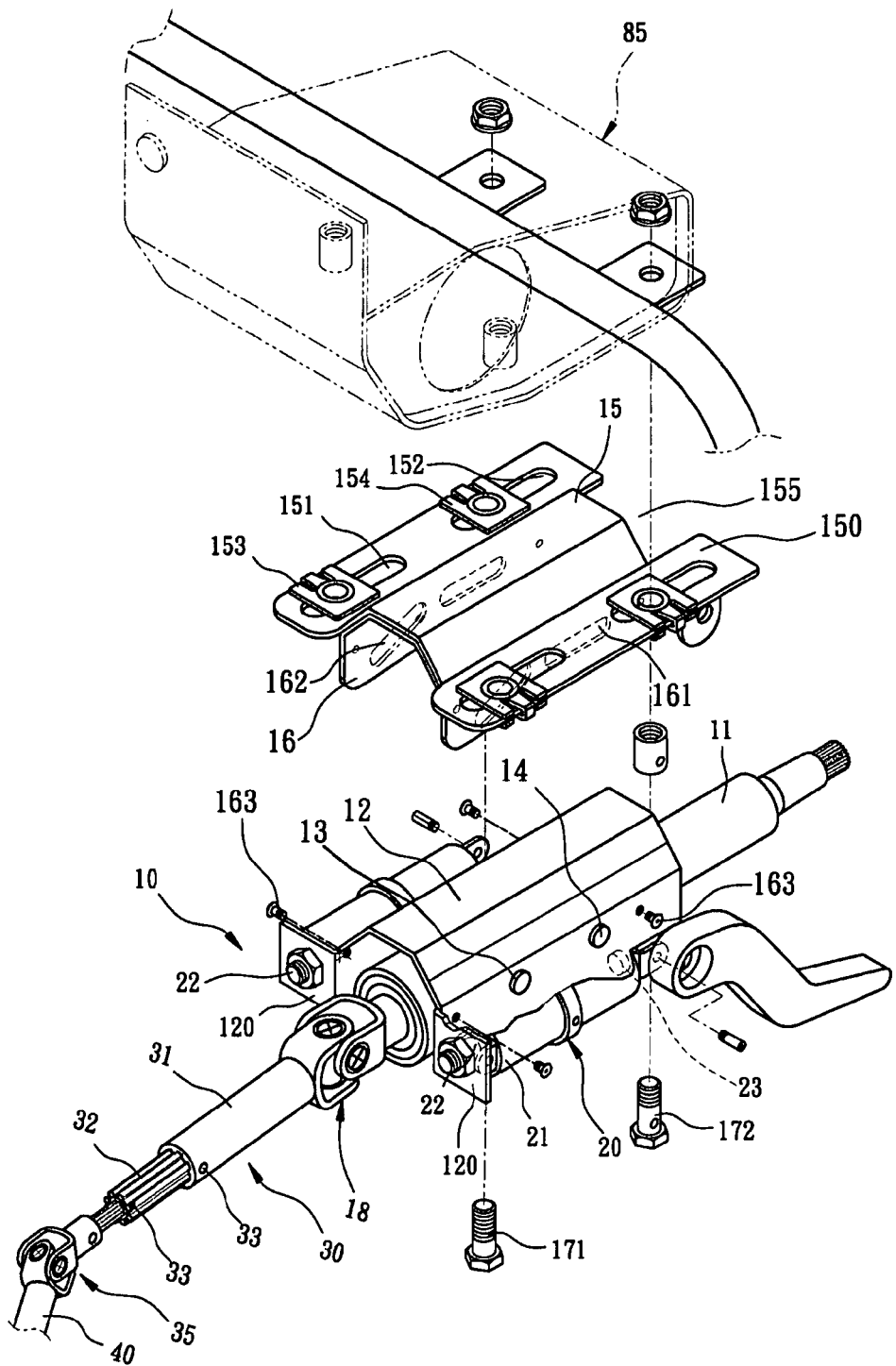
FIG. 2 is an enlarged perspective view of the retractable steering mechanism shown in FIG. 1.
Figure 3:
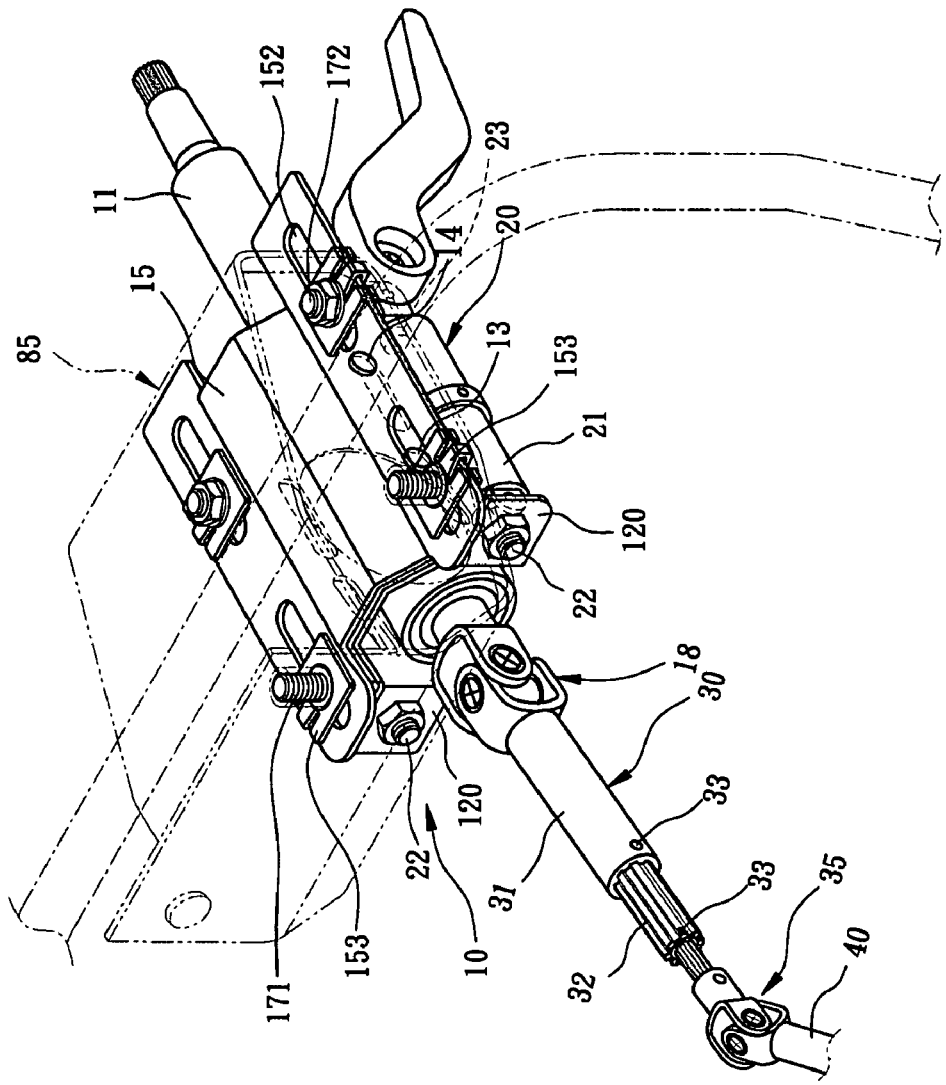
FIG. 3 is a perspective view of the retractable steering mechanism in another position than shown in FIG. 2.
Figure 4:
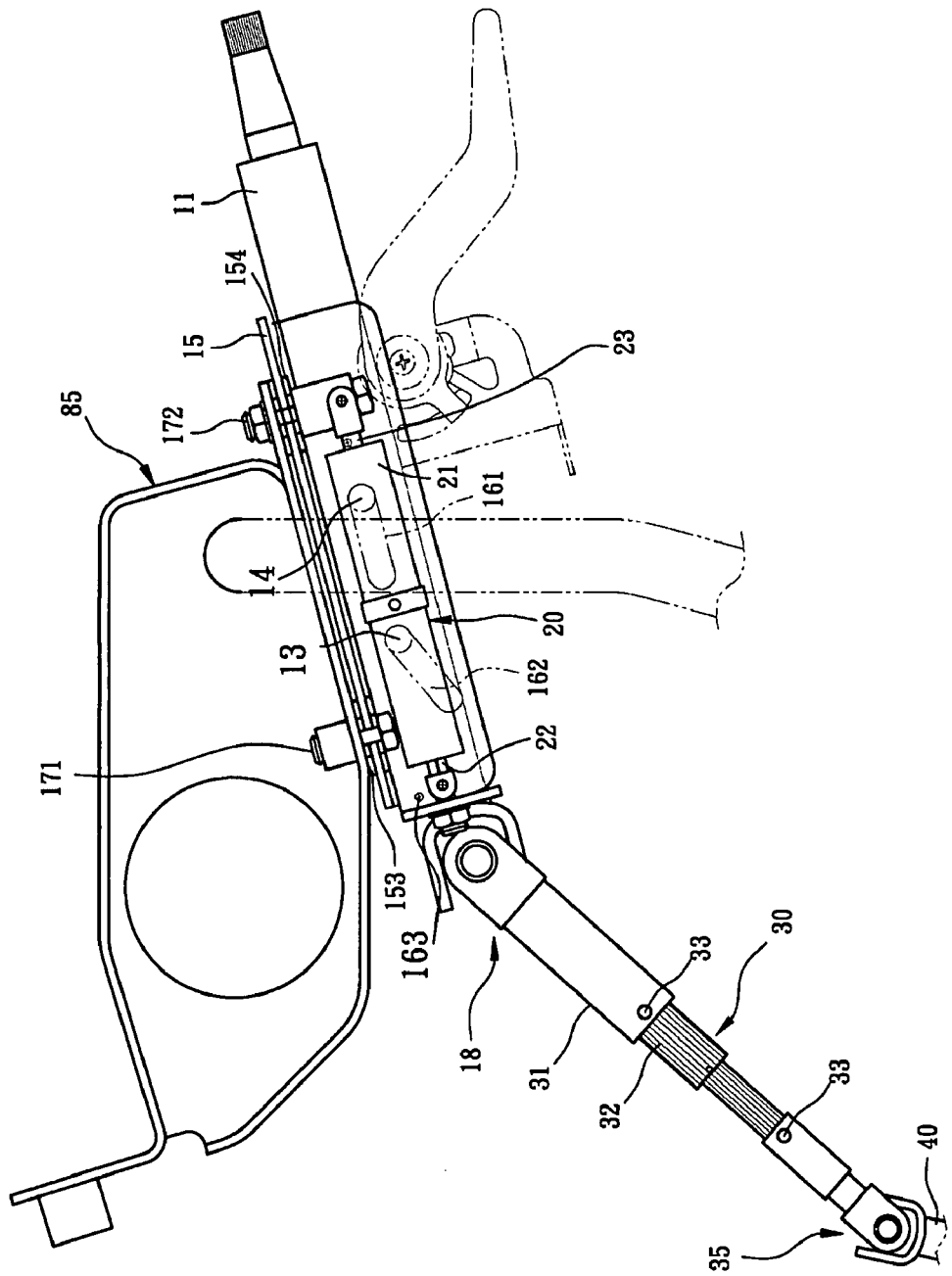
FIG. 4 is a side view of the retractable steering mechanism shown in FIG. 3.
Figure 5:
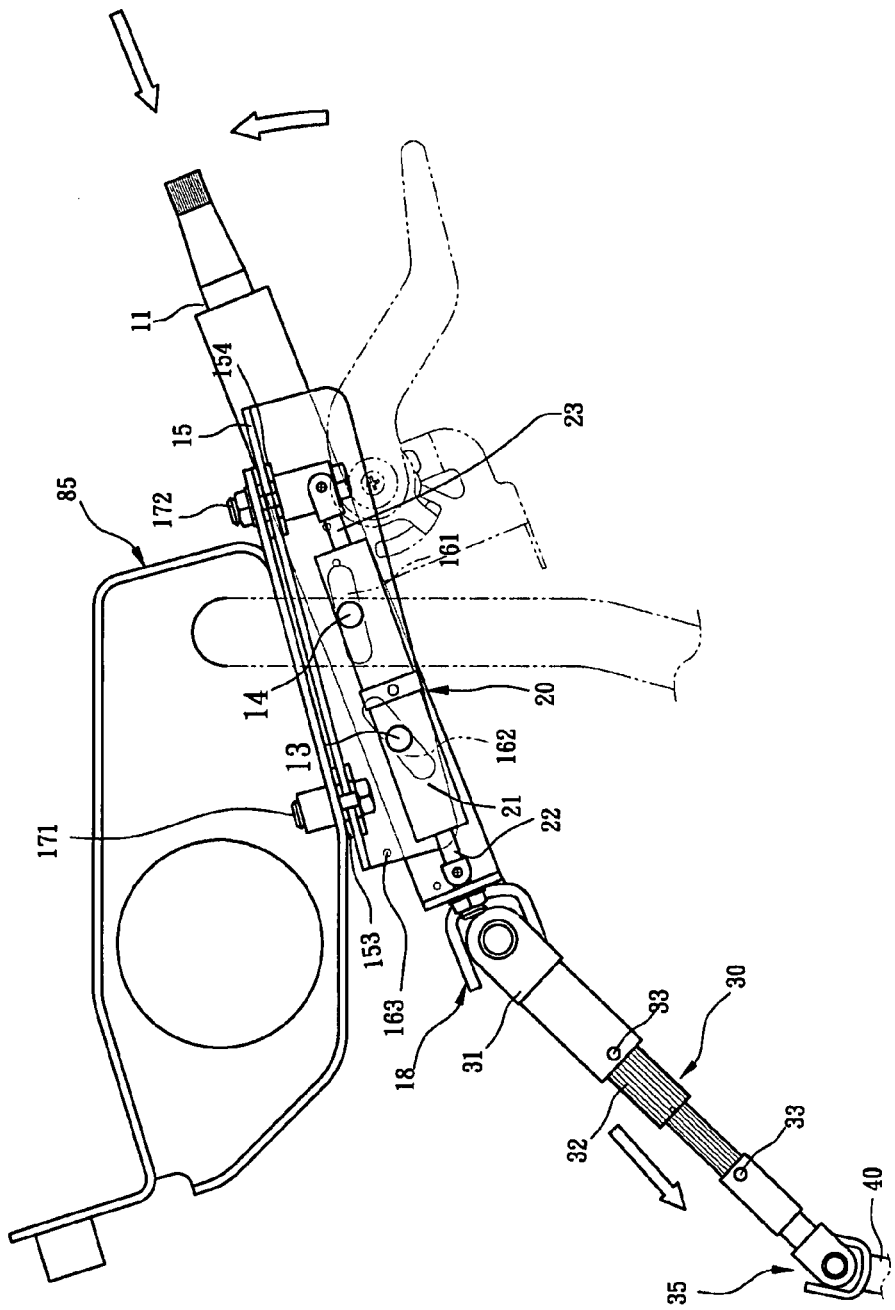
FIG. 5 is a side view of the retractable steering mechanism in another position than shown in FIG. 4.
Figure 6:
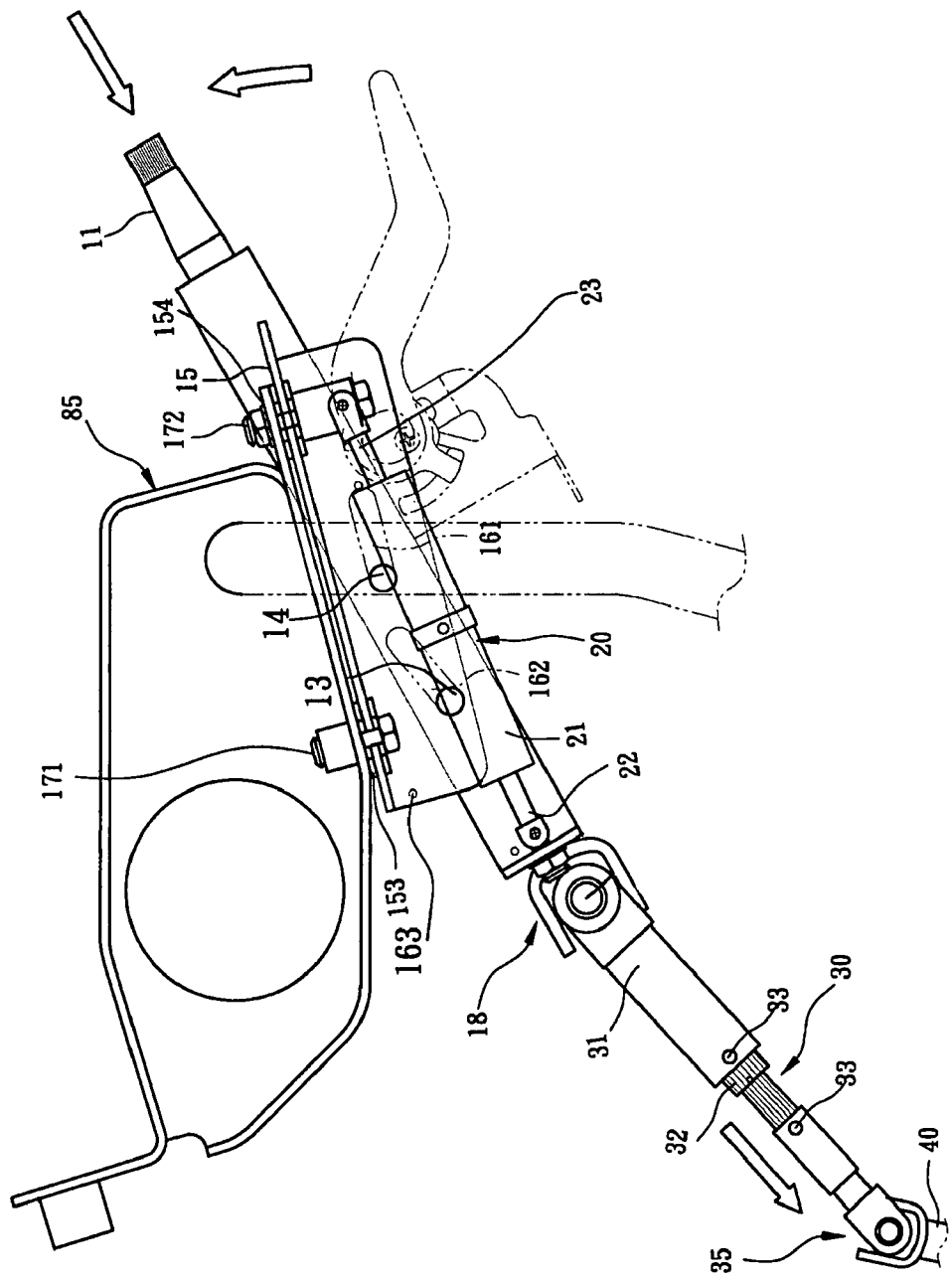
FIG. 6 is a side view of the retractable steering mechanism in another position than shown in FIG. 5.
Figure 7:
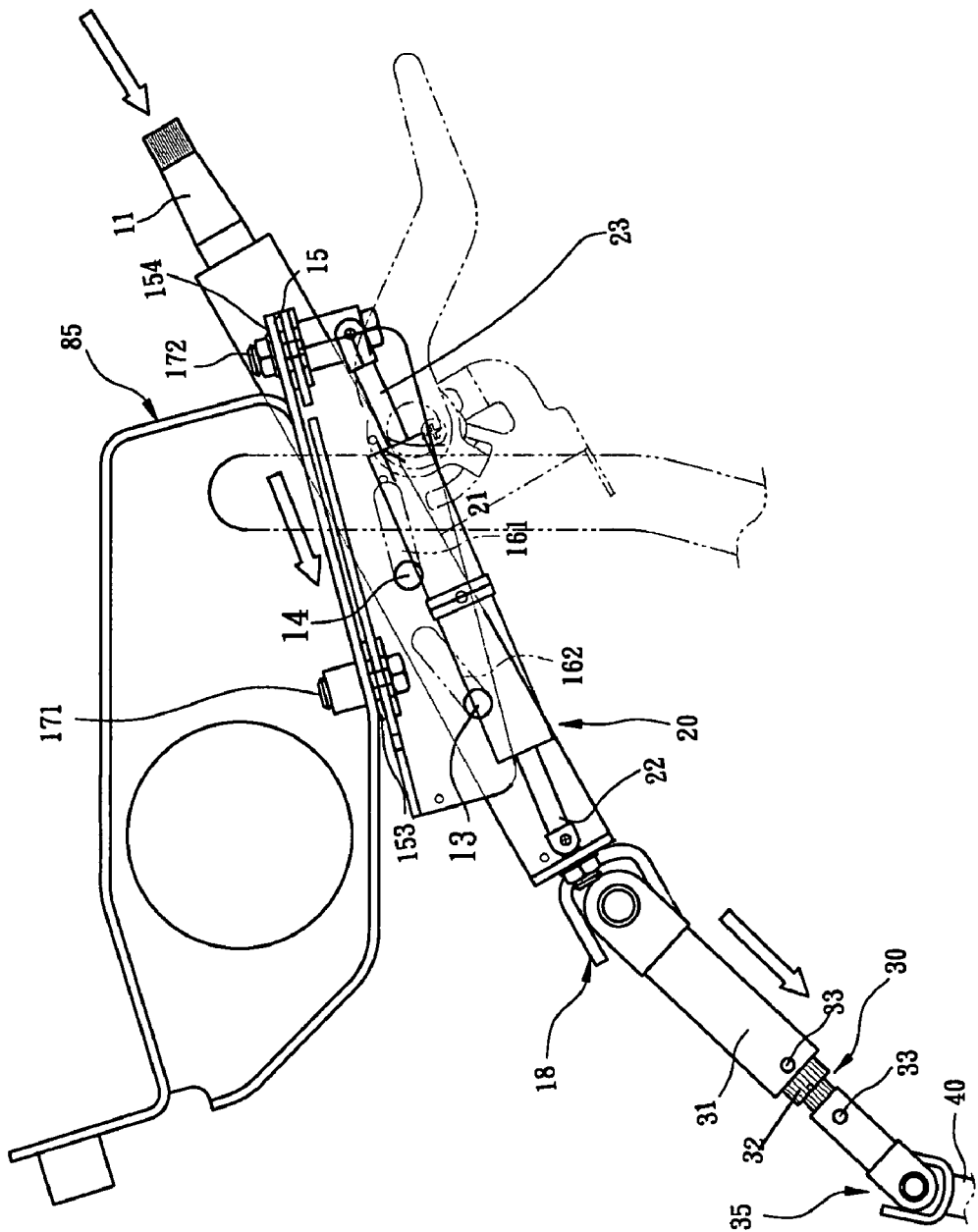
FIG. 7 is a side view of the retractable steering mechanism in another position than shown in FIG. 6.

Referring to FIGS. 2 and 3, the retractable steering mechanism includes a steering wheel 88, a steering column 11, a shell 12, a first cover 15, a second cover 16, a telescopic device 30, a connector 40, a moving unit 20 and an actuation unit 70.

The first cover 15 includes a middle portion and two lateral portions 150 extended from the middle portion in parallel. Two slots 151 and 152 are defined in each of the lateral portions 150 of the first cover 15.

The second cover 16 includes a middle portion and two lateral portions 160 extended from the middle portion in perpendicular. Two slots 162 and 161 are defined in each of the lateral portions 160 of the second cover 16. The slots 162 has a bent shape. The middle portion of the second cover 16 is secured to the middle portion of the first cover 15 by welding for example.

The shell 12 includes a middle portion and two lateral portions extended from the middle portion in perpendicular. A plate 120 is extended from each of the lateral portions of the shell 12 in perpendicular. Two bosses 13 and 14 are formed on each of the lateral portions of the shell 12. The shell 12 is beneath the second cover 16. The bosses 13 and 14 are movably disposed in the slots 162 and 161. Therefore, the shell 12 is movable relative to the second cover 16, the first cover 15 and the frame 85.

At least one releasable latch 163 is provided between the shell 12 and the second cover 16. The releasable latch 163 is used to position the shell 12 relative to the second cover 16. The releasable latch 163 can however be released in a car accident, thus allowing the movement of the shell 12 relative to the second cover 16. The releasable latch 163 may be made of plastic or soft metal material.

Threaded bolts 171 and 172 are driven into the frame 85 through the slots 151 and 152 so that the first cover 15 is movably connected to the frame 85. The threaded bolts 171 and 172 may be inserted through slides 153 and 154 so that the first cover 15 can smoothly be moved relative to the frame 85.

The steering column 11 is connected to the steering wheel 88. On the other hand, the steering column 11 is supported by the shell 12 so that the former is rotational, but not movable, relative to the latter.

The telescopic device 30 includes a tube 31 and a shaft 32 inserted in the tube 31. The position of the tube 31 relative to the shaft 32 is held by at least one releasable latch 33. The tube 31 is connected to the steering column 11 by a universal joint 18. The shaft 32 is connected to a connector 40 by a universal joint 35. The connector 40 is connected to the front wheels 82 conventionally and will not be described in detail.

The moving unit 20 includes two cylinders 21. Two rods 22 and 23 are extended from each of the cylinders 21. Each of the rods 22 includes a tip inserted through a related one of the plates 120 and engaged with a nut so that the rods 22 are connected to the shell 12 and therefore the steering column 11 and the steering wheel 88.

A yoke is secured to each of the rods 23. A sleeve is pivotally connected to a related one of the yokes by a pin. Each of the threaded bolts 172 is inserted through a related one of the sleeves. Therefore, the rods 23 are connected to the frame 85.

Referring to FIG. 1, the actuation unit 70 includes a cylinder 71 and a rod 75 extended from the cylinder 71. The rod 75 includes a tip secured to a bumper 76 of the vehicle 80. The cylinder 71 is in communication of fluid with the cylinders 21. That is, fluid can travel between the cylinder 71 and the cylinders 21. The fluid may be liquid, air or any proper sort of gas.

On hitting an object, the bumper 76 pushes the rod 75. The rod 75 causes more of the fluid to enter the cylinders 21 from the cylinder 71 so that the rods 22 and 23 are further extended from the cylinders 21 as shown in FIGS. 4 through 7. Therefore, the steering column 11 and the steering wheel 88 are retracted and tilted.

In an alternative embodiment, the cylinder 71 and the rod 75 may be replaced with a cylinder containing an explosive that is ignited the same time as an explosive is ignited in an airbag. The ignition of the explosives is controlled by an electronic control unit of the vehicle 80.

Figure 8:
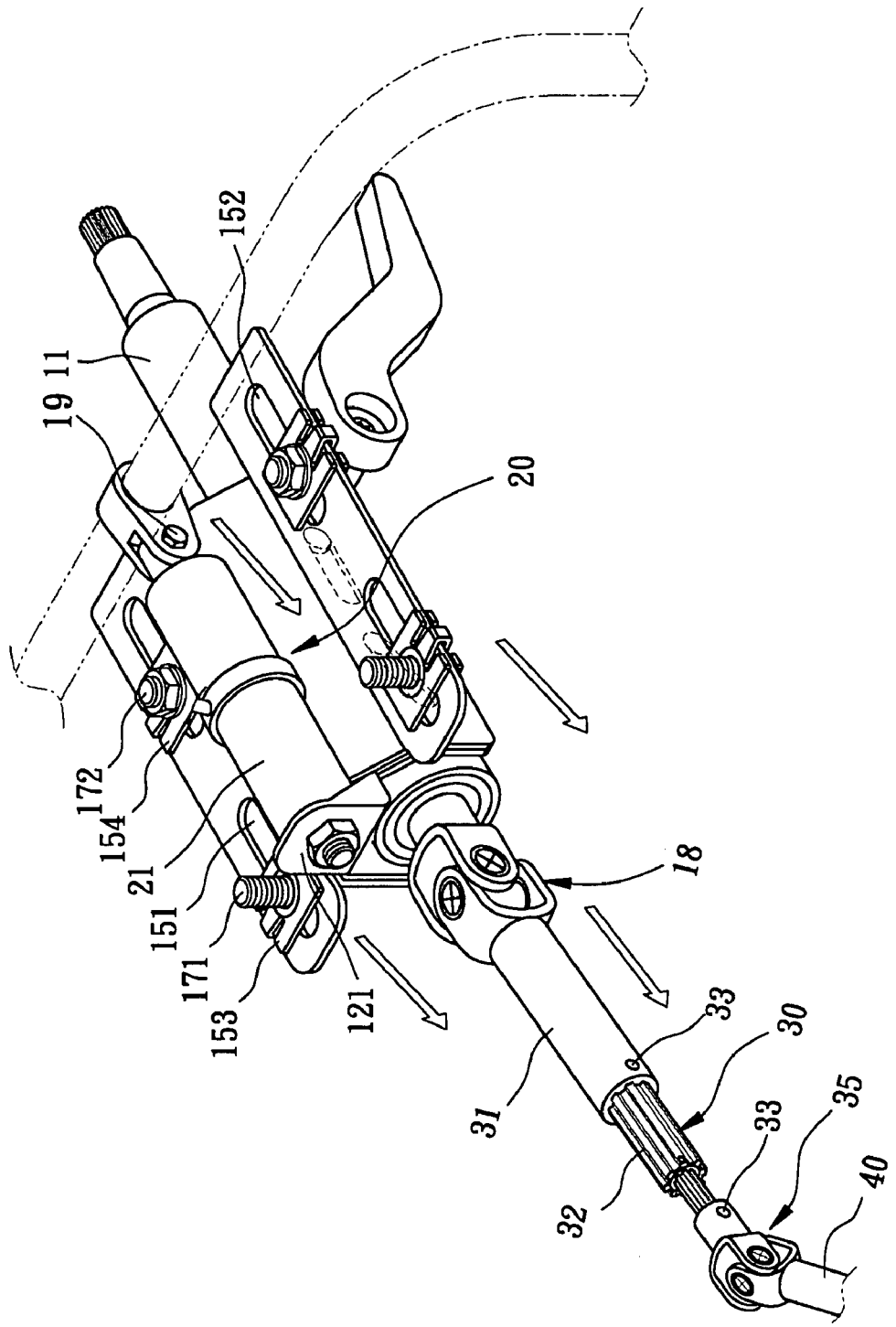
FIG. 8 is a perspective view of a retractable steering mechanism according to the second embodiment of the present invention.

Referring to FIG. 8, there is shown a retractable steering mechanism according to a second embodiment of the present invention. The second embodiment is identical to the first embodiment except using a single cylinder 21 instead of two cylinders 21 and a single plate 121 instead of two plates 120.

Figure 9:
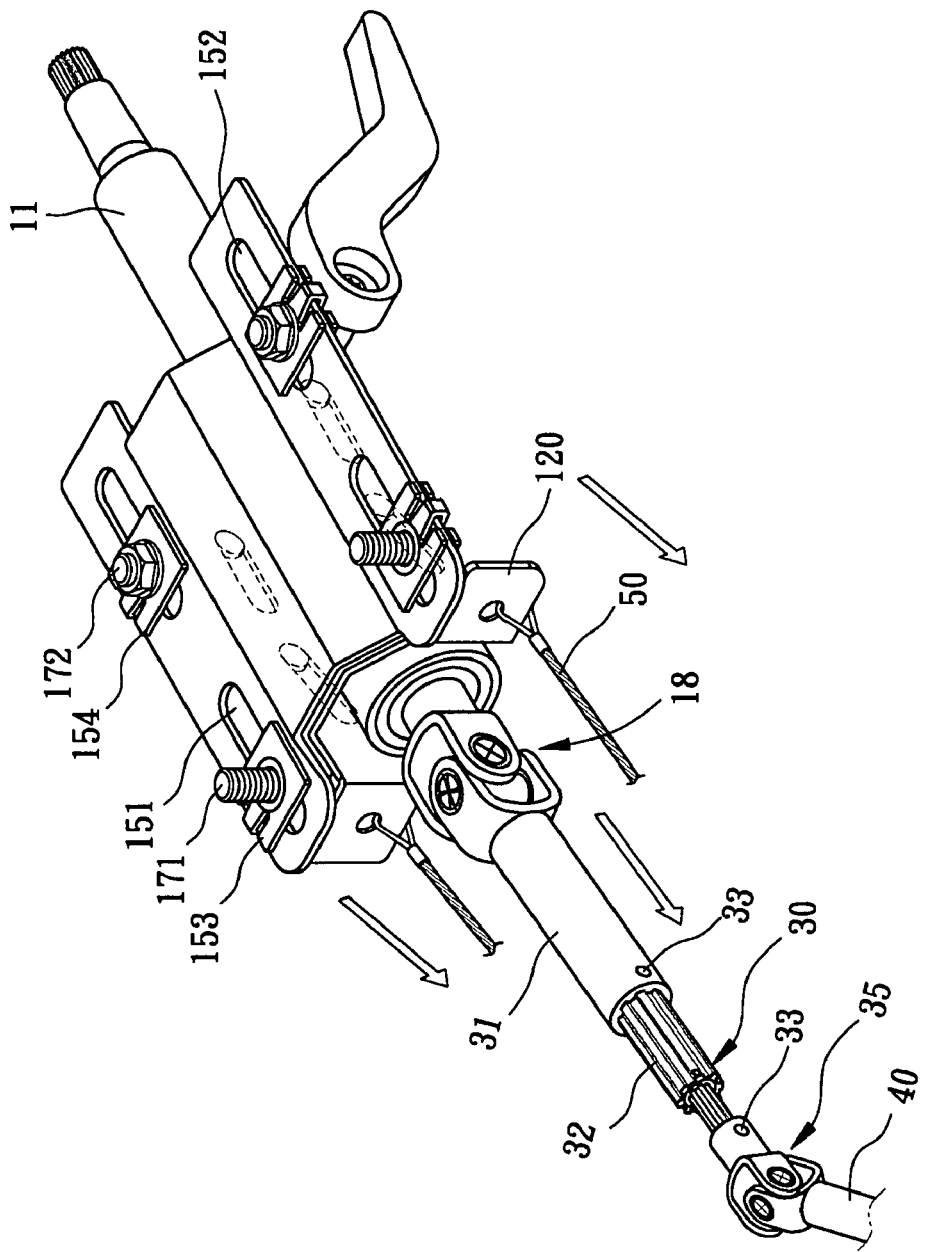
FIG. 9 is a perspective partial view of a retractable steering mechanism according to the third embodiment of the present invention.
Figure 10:
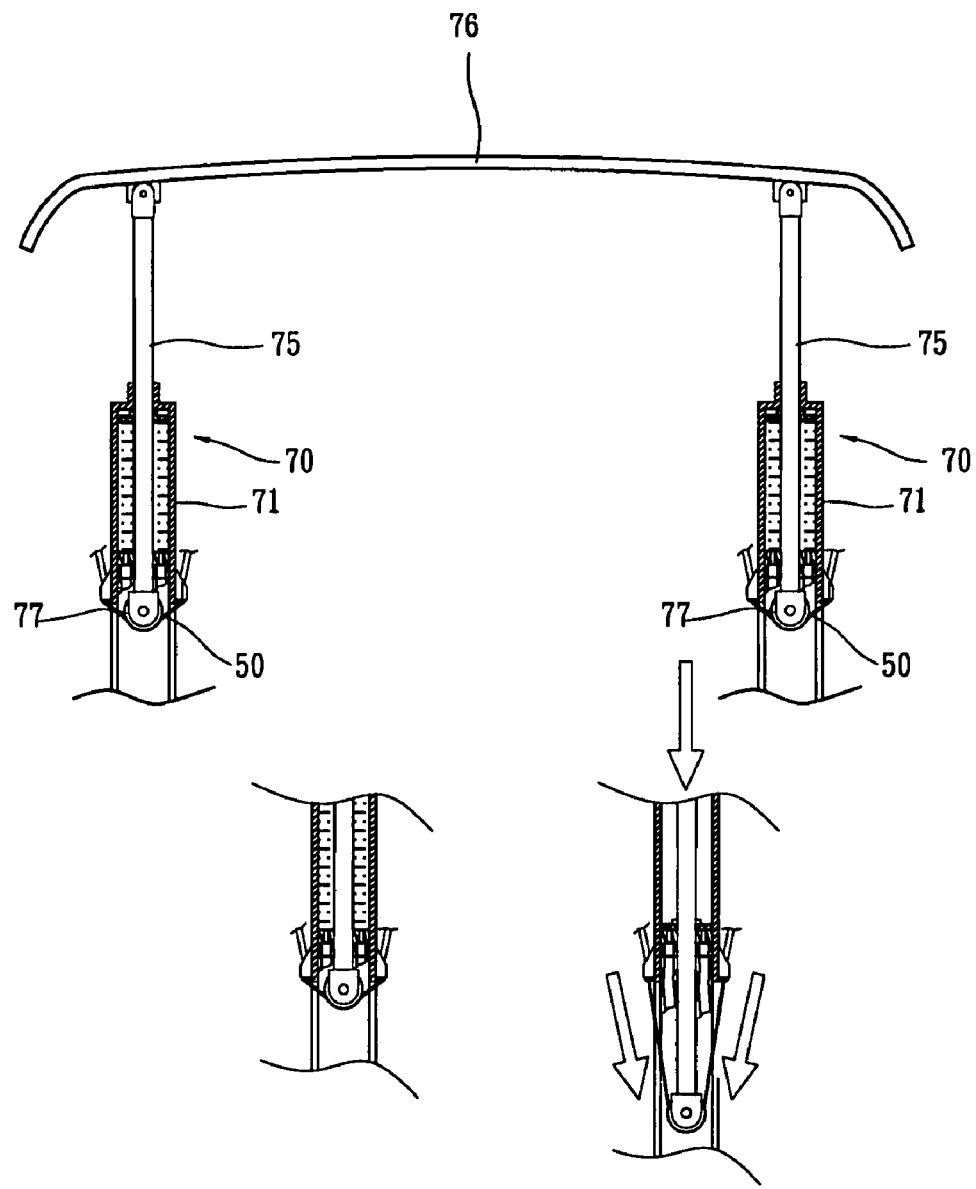
FIG. 10 is a top view of the retractable steering mechanism shown in FIG. 9.

Referring to FIGS. 9 and 10, there is shown a retractable steering mechanism according to a third embodiment of the present invention. The third embodiment is identical to the first embodiment except two things. Firstly, two cables 50 are used instead of the cylinders 21 and the rods 22 and 23. Secondly, two actuation units 70' are used instead of the single actuation unit 70. Each of the actuation units 70' includes a cylinder 71 secured to the vehicle 80, a rod 75 with an end connected to the bumper 76 and a pulley 77 connected to another end of the rod 75 in the cylinder 71. Each of the cables 50 includes an end secured to the shell 12 and another end wound around a related one of the pulleys 77 and secured to a related one of the cylinders 71.

On hitting an object, the bumper 76 pushes the rods 75 and the pulleys 77 that in turn cause longer sections of the cables 50 to enter the cylinders 71 so that the shell 10, the steering column 11 and the steering wheel 88 are retracted.

Figure 11:
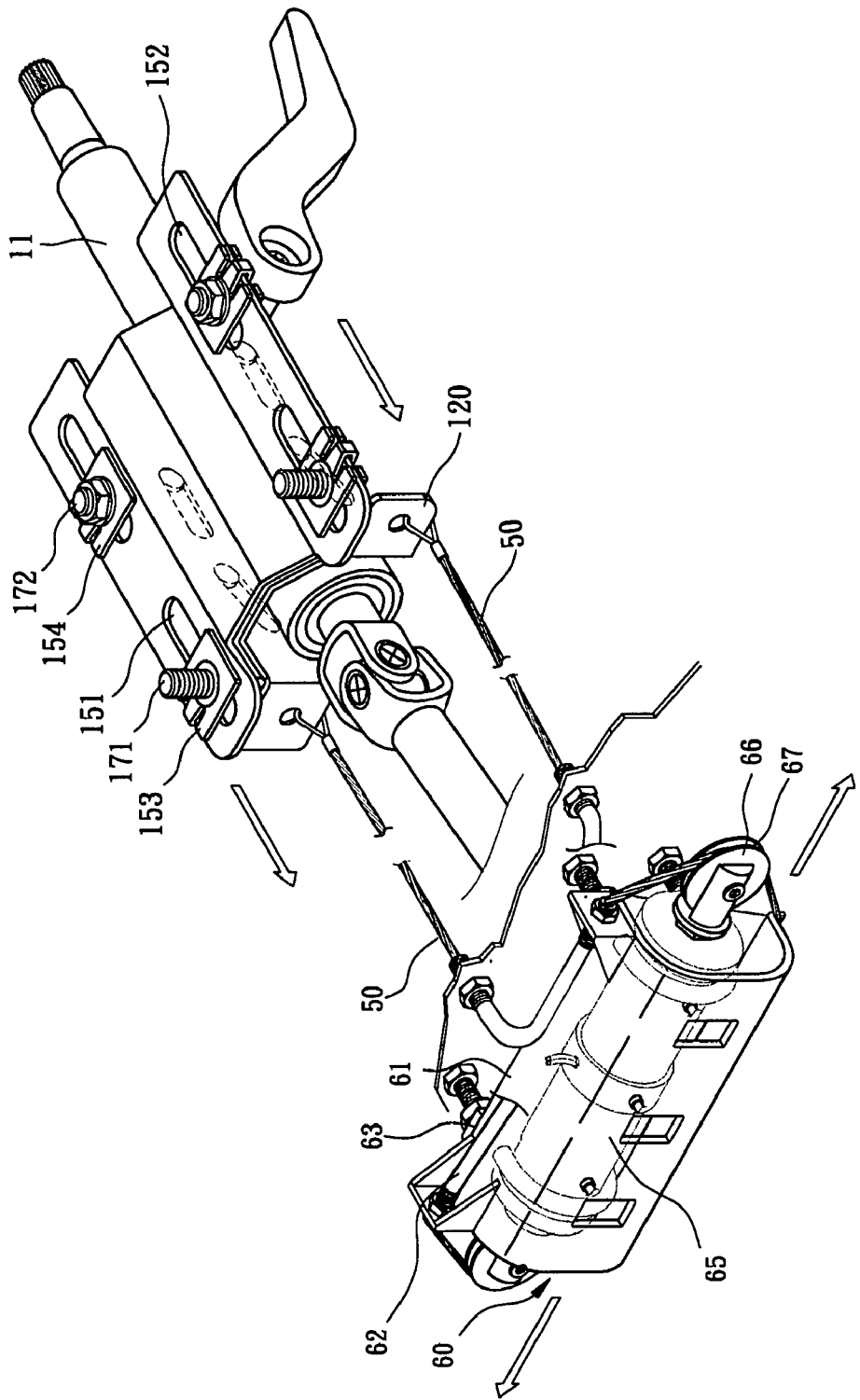
FIG. 11 is a perspective view of a retractable steering mechanism according to the fourth embodiment of the present invention 7.

Referring to FIG. 11, there is shown a retractable steering mechanism according to a fourth embodiment of the present invention. The fourth embodiment is like the third embodiment except two things. Firstly, a single cable 50 is used instead of two cables 50. Secondly, an actuation unit 60 is used instead of the actuation units 70'. The actuation units 60 includes a frame 61, two ears 63 formed on the frame 61, two sleeve 62 supported on the frame 61, a cylinder 65 supported on the frame 61 and two pulleys 66 each attached to an end of the cylinder 65. Two threaded bolts are driven into the vehicle 80 through the ears 63 so that the frame 61 is secured to the vehicle 80. The cable 50 includes two halves each wound around a related one of the pulleys 66 and a related one of the sleeve 62 and secured to the shell 12.

When the vehicle 80 hits an object, the electronic control unit thereof sends a signal to actuate the airbags and another signal to extend the cylinder 65. The extension of the cylinder 65 causes the pulling of the cable 50 and the retraction of the shell 10, the steering column 11 and the steering wheel 88. The extension of the cylinder 65 can be caused by the input of fluid or the explosion of an explosive like that is generally used in the airbags.

Figure 12:
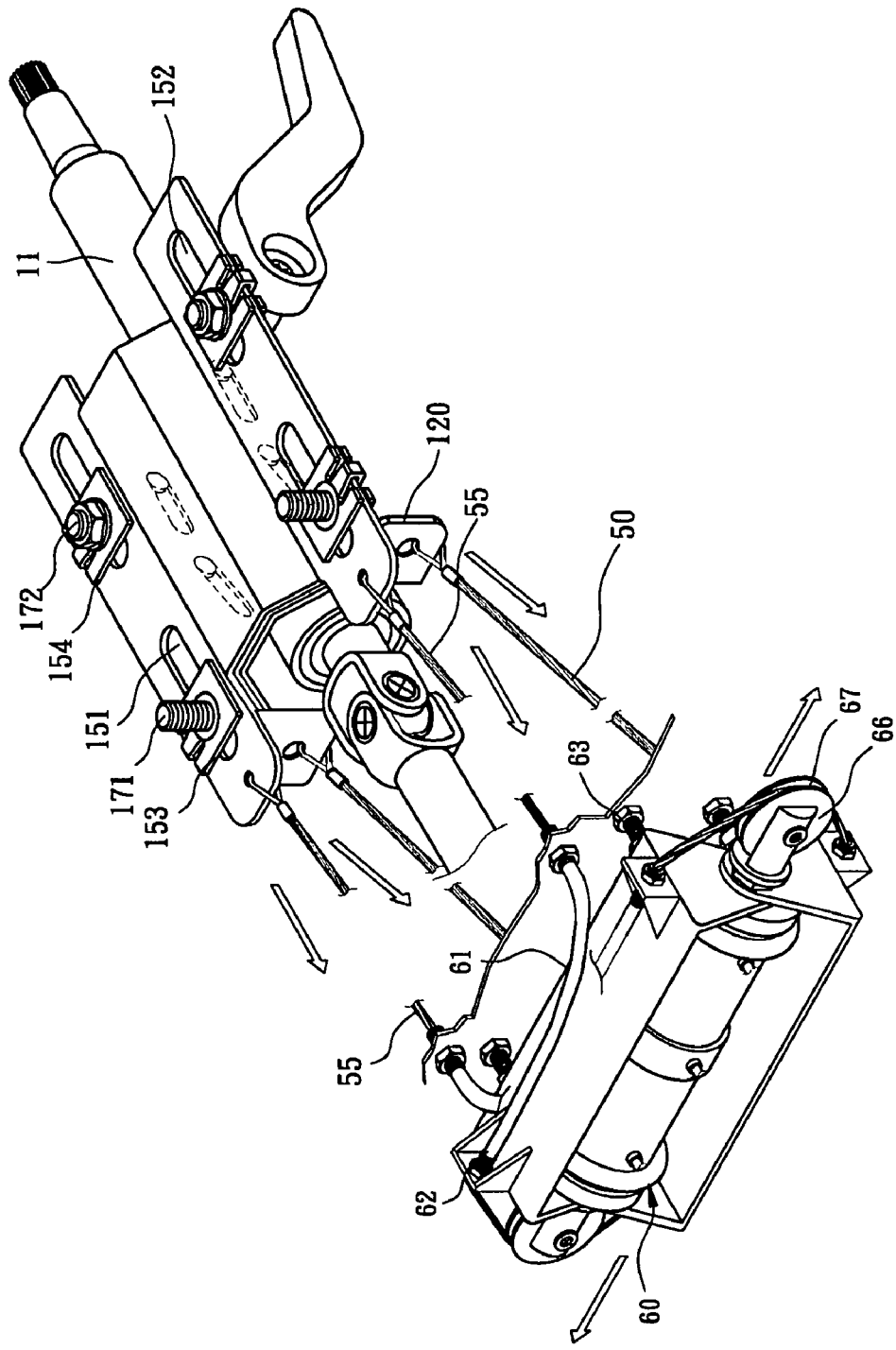
FIG. 12 is a perspective view of a retractable steering mechanism according to the fifth embodiment of the present invention.

Referring to FIG. 12, there is shown a retractable steering mechanism according to a fifth embodiment of the present invention. The fifth embodiment is identical to the fourth embodiment except including two cables 50 instead of the single cable 50. Each of the cables 50 includes an end connected to a related one of the lateral portions 150 of the first cover 150 and another end connected to a related one of the plates 120 of the second cover 16. Accordingly, two more sleeves 62 are used to guide the cables 50.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A retractable steering mechanism for a vehicle, comprising:
    a steering wheel;
    a steering column connected to the steering wheel;
    a telescopic device connected to steering column;
    a connector for connecting the telescopic device to two front wheels of the vehicle;
    a first cover connected to the vehicle;
    a second cover connected to the first cover and comprising at least two slots defined therein;
    a shell for housing the steering column so that the steering column is rotational in the shell, the shell comprising at least two bosses formed thereon and movably disposed in the slots;
    a moving unit provided between the vehicle and the shell and operable, in a car accident, to retract and tilt the shell with the steering column in response to moving the bosses in the slots;
    an actuation unit for actuating the moving unit; and
    a releasable latch disposed between the shell and the second cover,
    wherein the moving unit comprises two cylinders attached to the vehicle and two rods extending from the cylinders respectively and connected to the shell so that the steering wheel is retracted from a seat when the rods are further extended from the cylinders; and
    wherein each of the cylinders is a hydraulic cylinder.

* * * * *